United States Patent Office 3,600,443
Patented Aug. 17, 1971

3,600,443
PROCESS FOR THE CATALYTIC OXIDATION OF LOWER OLEFINS TO CARBONYLS AND ACIDS
Guidobaldo Cevidalli, Milan, Vahan Gurdjian, Mantova, Nicola Giordano, Milan, and Adriano Del Vesco, Mantova, Italy, assignors to Universal Oil Products Company, Des Plaines, Ill.
No Drawing. Continuation-in-part of application Ser. No. 536,148, Mar. 21, 1966, which is a continuation of application Ser. No. 119,312, June 26, 1961. This application Sept. 26, 1966, Ser. No. 581,718
Claims priority, application Italy, July 1, 1960, 11,695/60
Int. Cl. C07c 45/04, 51/32
U.S. Cl. 260—604R   5 Claims

ABSTRACT OF THE DISCLOSURE

A process for the oxidation of ethylene and propylene to the corresponding aldehyde or acid in which a heteropolyacid or oxide is formed from a first component, an oxide of vanadium, tungsten and molybdenum, and a second component, an acid or oxide of boron, aluminum, silicon, titanium, germanium, zirconium, tin, cerium, phosphorus, arsenic, antimony, bismuth, sulphur, chromium, selenium, tellurium, manganese, iron, cobalt and nickel. The ethylene or propylene is brought into gas-solid contact with the solid catalyst on a support in the absence of any liquid phase for the contact time of 0.5 to 10 seconds at a temperature of 180° to 400° C., a pressure up to 10 atmospheres, a water vapor: olefin molar ratio of 1 to 10 and an oxygen: olefin ratio of 0.5 to 5.

---

This application is a continuation-in-part of our copending application Ser. No. 536,148, filed Mar. 21, 1966 as a continuation of application Ser. No. 119,312 of June 26, 1961, now abandoned.

The present invention relates to a process for the oxidative production of oxygenated compounds from light hydrocarbons by means of oxidation and, more particularly, to a new process for oxidizing olefins into carbonyl compounds (e.g. acetaldehyde, acetone and the like) and carboxylic acids (e.g. acetic acid).

It has already been proposed to provide a process for oxidizing ethylene into acetaldehyde and acetic acid with water-soluble redox catalyst systems (i.e. solutions or slurries) primarily based upon copper chloride, iron chloride and mercury chloride in what may be termed a liquid-phase reaction. In such systems, the catalyst may be in solution or in the form of a solid suspension or slurry in which a layer of liquid is interposed between any gas phase and the reaction face of the catalytic compound. In general, the reaction of ethylene with oxygen is carried out at extremely high pressures (not lower than 20 atm.), preferably at pressures of 80–120 atm., at which the reaction medium is practically all liquid in the sense that there is little, if any, solid/gas interface at which any reaction can be carried out. The prior techniques in this field have generally made use of agitated autoclaves and similar reaction vessels which were incapable of continuous reactions, often were uncontrollable and were relatively expensive. Furthermore, reaction efficiencies in terms of yield per catalyst quantity etc. were also quite low.

An object of the present invention is to provide a new method for selectively oxidizing with high yields olefins into carbonyl compounds and carboxylic acids and particularly ethylene into such saturated oxygen-containing compounds as acetaldehyde, acetic acid or mixtures of the two, propylene into the saturated compound acetone, and butenes, pentenes and other higher olefins into the corresponding saturated carbonylic and carboxylic compounds without reduction in carbon number.

It is a further object of the invention to provide a particularly active catalyst for carrying out the method according to the invention.

Still another objection of this invention is to provide an improved process for the catalytic oxidation of olefins to the corresponding carbonyl (e.g. aldehydes or ketones) or carboxyl (acid) compounds whereby the disadvantages inherent in prior, liquid-phase reaction systems can be avoided.

As originally set forth in the aforementioned prior applications, it has in fact been found, according to the invention, that one or more compounds, in particular oxides and acids of metals such as vanadium, tungsten and molybdenum, preferably associated with suitable acids or oxides hereinafter specified and using a suitable support if necessary, are very efficient and extremely active catalysts for a gas-phase oxidative process yielding the corresponding products as mentioned above. The acids or oxides with which the aforesaid metal oxides and acids may with advantage be associated, and which may be referred to as adjuvants, contain one or more elements selected from the group consisting of boron, aluminum, silicon, titanium, germanium, zirconium, tin, cerium, phosphorus, arsenic, antimony, bismuth, sulphur, chromium, selenium, tellurium, manganese, iron, cobalt, and nickel.

We have discovered, most surprisingly, that in spite of the known requirement for the presence of water in the olefin oxygen/catalyst reaction system—at elevated pressures—the reaction efficiency and catalyst utilization can be markedly improved and a greater yield of carbonyl or carboxylic acid compounds obtained when the reaction is carried out, not in the liquid phase, but rather in a vapor phase whereby the predominant reaction interface is essentially of the gas/solid type. Thus it is an essential feature of the present invention that the gaseous reactants be brought into intimate contact with the specific type of solid catalyst, which permits the vapor-phase reaction, as discussed below, under such conditions that the catalyst remains free from a liquid barrier between the catalyst and the gas throughout the reaction process in spite of the presence of water vapor (having relatively low vapor pressure) in the reactant mixture. Moreover, it has been found to be important to maintain the reaction pressure in the atmospheric range (i.e. about 1 atm. gauge), and certainly not more than 10 atm. (gauge). Thus it is indeed surprising that a low-pressure vapor-phase reaction can be carried out on a specific, water-free catalyst system to yield far greater proportions of the carboxyl and carbonyl oxidative products than has been possible heretofore.

The association of the oxides (or acids) of vanadium, tungsten or molybdenum with the required adjuvant, selected from the group listed hereinabove, is brought about, according to the invention, by methods adapted to promote an intimate mixing of the two constituens in the catalyst. In this description, the first constituent of the catalyst shall be considered to be one or more oxides (or acids) of the metals vanadium, tugnsten or molybdenum, while the second constituent of the catalyst shall be considered to be one or more of the adjuvants of the group of elements hereinabove listed. It will be seen from the examples given hereinbelow that, while it is often sufficient to mix the two constituents mechanically in the presence of a solvent which will favor disintegration into particles of very small size, it is sometimes advisable to have recourse to more complicated methods whereby true complex compounds are formed from the constituents of the catalyst. These complex compounds, which are called heteropoly acids, are composed of a coordinating radical of acid character such as phosphoric, silicic, titanic, arsenic, chromic manganic, stannnic, boric, selenic, telluric acids and the like, with which oxide radicals of one or more amphoteric metals, such as vanadium, tungsten and molybdenum, are coordinated.

Consequently, the first constituent of the catalyst will in the course of this description also be called the coordinated radical constituent, while the second constituent or adjuvant will also be called the coordinating radical constituent.

According to the invention, phosphomolybdic, silicomolybdic, phosphotungstic, silicotungstic, phosphomolybdotungstic, silicomolybdotungstic, phosphovanadomolybdic, phosphovanadotungstic, vanadomolybdic, manganomolybdic, arsenomolybdic and chromomolybdic acids and the like and their salts, mainly those of copper, bismuth, iron, nickel, cobalt, manganese, cadmium, zinc, both alkali and alkaline-earth metals, have been shown to be particularly active catalysts both singly and in mixtures.

Heteropoly acids are prepared according to any of the conventional methods, whereas heteropoly salts are prepared by neutralizing the corresponding heteropoly acids.

Furthermore, we have discovered that the most suitable catalyst system for supporting the vapor-phase reaction of the present invention must contain an oxide of molybdenum (e.g. as the simple oxide or a heteropoly acid thereof) in combination with at least one oxide or acid, tungsten, vanadium, boron, aluminum, silicon, titanium, germanium, zirconium, tin, cerium, phosphorus, arsenic, antimony, bismuth, sulphur, chromium, selenium, tellurium, manganese, iron, cobalt and nickel; most advantageously, the heteropoly acids are the corresponding phospho acids. The olefins should have a carbon number ranging from 2 to 8 and, preferably, from 2 to 5.

Catalysts formed from the ammonium salt of a heteropoly acid should preferably, before being used, be treated so as to eliminate the ammonia by decomposition through heating to about 300° C. with vigorous air circulation, in order to prevent a radical reduction of the catalyst. In the other cases, activation by heating to 200–300° C., possibly with air circulation, for a period of 10–12 hours is also advised.

The catalyst, according to the invention, can be employed alone, in pellet or extruded form, or else it can be deposited on a suitable support with the concentration of the catalytic composition ranging from 10% to 75% in relation to the total weight of the catalyst.

Although all the supports tested appeared to be effective provided that their specific surface area was not too small (not below 1 m.²/g.), suitable examples being Celite, the diatomaceous earths, Alundum, the bentonites, the bauxites, gels such as silica gel, alumina, aluminum phosphate, titanium dioxide and zirconium dioxide, the best results were obtained with silica gel and special forms of pure silica known as "Aerogels."

Among the various known techniques for depositing the active product on the support, a method of impregnation has been preferred according to which this preparation of the catalyst is carried out in the following manner: first the two components of the catalyst (oxide+acid or oxide+oxide) are intimately mixed in the presence of a solvent in such a manner as to produce a solution or a flowable paste, or else the heteropoly acid or heteropoly salt is dissolved in the solvent; then the selected support is impregnated therewith by mixing and allowing the whole to stand for the necessary period of time. Then, evaporation is carried out to obtain the dry product which generally requires no particular activation but merely thorough drying. Water may be used as the solvent for mixing the active components, but oxygenated organic compounds such as alcohols, ethers, esters, dioxane and the like are preferable.

The catalyst prepared in this manner, besides being used in a fixed bed, can also with advantage be used in a fluid bed in order to provide easier temperature control.

In the case of reaction products with several degrees of oxidation it has been found, according to the invention, that the oxidizing reaction can be controlled by halting it when the desired degree of oxidation has been reached. The oxidation of ethylene, for example, can be halted at the stage of acetaldehyde, or it can be caused to proceed further up to the stage of acetic acid. It is therefore possible to obtain, in a pure state, either acetaldehyde or acetic acid, as well as mixtures of the two in varying proportions, by dosing the catalyst and also by controlling the conditions of the reaction. Investigations and numerous experimental tests have in fact shown that, according to the invention, the formation of acetic acid is promoted by a high concentration of oxides of vanadium, tungsten or molybdenum in the catalyst with respect to other components, by certain supports (for example silica gel) and by increasing the temperature and the contact time of the reaction. Those heteropoly acids, therefore, which have a high proportion of oxides of molybdenum, tungsten, and vanadium in relation to the coordinating element, have a marked tendency to yield acetic acid.

In the process according to the invention the presence of water is essential and essentially any water/olefins ratio can be employed, but it is preferable to maintain a molar ratio within the range, for example, between 1 and 10. It is manifest that the dilution of the reaction products increases with this ratio. According to the invention, the oxidizing medium can consist of oxygen or oxygen-containing mixtures such as air. The oxygen/olefin ratio is kept within the range from 0.1 to 5, depending on the composition of the reagent mixture. When using high oxygen/olefin ratios, it is preferable, in order to avoid an excessive formation of carbon oxides, to introduce the oxygen a little at a time at different levels of the reactor (i.e. at a plurality of locations). This artifice permits the use of a great quantity of oxygen while still keeping the concentration low because of the continuous consumption, and also offers the advantage of keeping the mixture well away from the limits of explosivity.

The best practical results may be obtained by keeping a concentration of olefin of 5 to 70% in the reactor. Even at lower concentrations satisfactory results are obtained but the reaction products are too diluted.

The starting olefin of the process according to the invention may be impure, that is, it may contain varying percentage of other gases such as aliphatic hydrocarbons (ethane and propane for example), carbon oxides, and inert diluents such as nitrogen; it has been found, in fact, that these gases have no harmful effect either on the catalyst or on the course of the reaction.

The presence of water is essential not only for the development of the reaction apart but also for keeping a uniform temperature and eliminating the heat of the reaction. The presence of an inert diluent such as nitrogen is useful, even if not indispensable. It is especially useful to introduce nitrogen (together with oxygen in the form of air, for example) with the water when working with low olefin percentages, in order to prevent excessive dilution in water of the reaction products.

The reaction temperature varies according to the catalyst used, the composition of the reagents and the other reaction conditions (contact time and pressure). The best results have been obtained between 180° and 400° C. with still more satisfactory reaction results at 200° to 350° C. The contact time varies similarly and is generally within the range of 0.05 to 10 seconds. It is preferable to make the reaction take place at atmospheric or slightly higher pressures. It has been found in fact that excessive operating pressures cause a diminution in the ratio between the desired products and the by-products. It is therefore advisable not to go above 10 atmospheres. Preferably the pressure should range between 1 and 5 atmospheres.

At the exit from the reactor, after removal of the condensable products, the gaseous mixture containing, besides unreacted olefin and oxygen, possible diluents and carbon oxides (whose proportion is kept down to acceptable values by adsorption or venting) is recycled after restoration of their original content of olefins, oxygen and water. The carbonyl compounds are separated by fractionation from the condensed solution, yet we prefer to send the alcohols and acids back into the reactor, the former in order to avoid further olefin loss and the latter in order to cause their concentration to reach a suitable value which will allow them to be recovered from a tapped fraction.

In order to explain more clearly the process herein described, some illustrative and non-limiting examples will now be set forth, relating to both the preparation of the catalyst and the oxidation process;

EXAMPLE 1

120 g. of molybdenum trioxide is mixed with 214 g. of 85% phosphoric acid with heating of the mixture gradually, until a temperature of 275° C. is reached. The mixture is permitted to cool, 240 cc. of water are added and the product is allowed to stand for 17 hours. Then into this solution 100 g. of "Aerogel" silica (with a specific surface area of about 400 m.$^2$/g.) is introduced into the solution, the water is evaporated on a water bath and finally the product is dried for 4 hours at 160° C.

By passing over the resulting solid catalyst a gaseous mixture consisting of 30% ethylene gas, 62% water vapor and 8% oxygen gas (by volume) at 250° C., with a contact time of 0.8 second, 10% of the ethylene is converted to acetaldehyde, 0.5% to carbon oxides and the remainder unreacted.

Almost identical results are obtained by using air instead of oxygen and by giving the gaseous mixture the following volumetric composition: ethylene 23%—water vapor 47%—air 30%.

EXAMPLE 2

Upon replacing of the ethylene of the reactant mixture in Example 1 with propylene, the conversion of propylene on the same catalyst and at a temperature of 260° C. with a contact time of 1 second was as follows: 7.2% of propylene to acetone, 1% to acids and 0.9% to carbon oxides; traces of impurities including acetaldehyde were also present. Similar results are obtained when the oxygen is contributed by air.

EXAMPLE 3

A catalyst is prepared using the same quantities of reagents as in Example 1, and heating similarly to 275° C. After cooling, the solid mass is mixed with 240 cc. of methyl alcohol, then the product is processed in the same manner as given in Example 1.

By passing the same gaseous reagents in the same proportions over the catalyst thus prepared (Example 1), at a temperature of 260° C. and with a contact time of 2 seconds, 19% of the ethylene is converted to acetaldehyde, 2.4% to acetic acid and 2% to carbonic oxides.

EXAMPLE 4

The catalyst prepared as in Example 1 is used with a gaseous reagent mixture with the following volumetric composition: ethylene 8%, water vapor 88%, oxygen 4% at a temperature of 280° C. and a contact time of 5 seconds at 5 atm. pressure. 29% of the ethylene is converted to acetaldehyde, 9% to acetic acid, 3% to carbon oxides and about 2% to ethyl alcohol.

EXAMPLE 5

15.36 g. of $Cr(NO_3)_3 \cdot 9H_2O$ is dissolved in water and then, from the hot solution, chromium hydrate is precipitated with ammonia. The washed precipitate is added to 40 g. of phosphomolybdic acid prepared according to Example 10 and to 32.75 g. of $H_3PO_4$ at 100% dissolved in a volume of water equal to volume of the catalyst support. 44.58 g. of Aerosil with a surface area of 460 m.$^2$/g., activated for 3 hours at 300° C., is impregnated when cold with the solution previously described. In order to facilitate absorption and ensure its homogeneity the mixture is stirred continuously. The mass is permitted to stand overnight, then dried over a water bath, and finally dried for 4 hours at 160° C. in an oven.

Over this catalyst a gas mixture of 32% ethylene, 62% water vapor and 6% oxygen (by volume) is passed at 250° C. with a contact time of 0.5 second. 7.8% of the ethylene is transformed into acetaldehyde, 0.6% to acetic acid and 1% of carbon oxides.

EXAMPLE 6

From a solution containing 5.39 g. of $Ce(NO_3)_3 \cdot 6H_2O$ at 98% titer, $Ce_2(MoO_4)_3$ is precipitated with the addition of a solution containing 4.46 g. of $Na_2MoO_4 \cdot 2H_2O$ at 99% titer.

The precipitate is washed with hot $H_2O$ by decantation to eliminate the $Na^+$ and $NO_3^-$-ions, and is dissolved in a solution containing 30.06 g. of $H_3PO_4$ at 100%; to this latter solution we add an aqueous solution of 23.77 g. of phosphomolybdic acid prepared according to the method described in Example 10. The final volume of this solution must be equal to the volume of the catalyst support. 35.49 g. of Aerosil with a surface area of 460 m.$^2$/g., dried for 3 hours at 300° C., is impregnated when cold with the above solution and stirred in order to obtain a homogeneous mass. The mass is then dried, first over a water bath and then for 4 hours in an oven, at 160° C.

Over this catalyst a gas mixture of 29% ethylene, 66% water vapor, and 5% oxygen (by volume) is passed at 250° C. with a contact time of 1 second; 16% of the ethylene is transformed into acetaldehyde, 1.2% to acetic acid and 1.5% to carbon oxides.

EXAMPLE 7

From an aqueous solution containing 9.886 g. of $FeCl_3 \cdot 6H_2O$ ferric hydrate is precipitated while hot with $NH_3$ in the presence of $NH_4Cl$. The precipitate is filtered, washed and then dissolved in a solution containing 40 g. of phosphomolybdic acid (see Example 10) and 32.6 g. of $H_3PO_4$ at 100%. The volume of this solution must be equal to that of the support.

44.48 g. of Aerosil with a surface area of 460 m.$^2$/g., dried for 3 hours at 300° C., are impregnated with the solution previously described and stirred until the mass is homogeneous. The mass is permitted to stand overnight, then dried over a water bath and, finally, dried for 4 hours at 160° C. in an oven.

This catalyst is used to react a mixture of 32% ethylene, 62% water vapor, 6% oxygen is passed at 250° C. with a contact time of 0.5 second; 10.2% of the ethylene is transformed into acetaldehyde, 0.9% to acetic acid and 0.9% to carbon oxides.

EXAMPLE 8

From a cold solution containing 7.787 g. of $$Ni(NO_3)_2 \cdot 6H_2O$$

we precipitate $Ni(OH)_2$ with dilute NaOH. The precipitate is filtered and washed until all trace of $Na^+$ ion disappears, then the $Ni(OH)_2$ is dissolved in 35.72 g. of $H_3PO_4$ at 100% and 50 cc. $H_2O$. To this is added another solution containing 27.37 g. of phosphomolybdic acid (see Example 10).

The resulting solution is used for impregnating 38.48 g. of Aerosil with a surface area of 460 m.$^2$/g., previously dried for 3 hours at 300° C. While the mass is impregnated it is stirred until it is homogeneous. The mass is next dried first over a water bath and then for 4 hours at 160° C. in an oven.

Over this catalyst there is passed a gas mixture of 27% ethylene, 68% water vapor and 5% oxygen (by volume) at 250° C. with a contact time of 0.24 second; 7.5% of the ethylene is transformed into acetaldehyde, 0.2% to acetic and 0.4% to carbon oxides.

EXAMPLE 9

100 g. of molybdenum trioxide is mixed with 83.5 g. of 85% phosphoric acid and heated gradually. After evaporation of the water, the heating is continued up to 275° C. At this point the product is cooled, 200 cc. of dioxane are added and the mixture is permittted to stand for 12 hours. Then, 480 cc. of silica gel are added and the product is heated to dryness in 4 hours at 160° C.

Over this catalyst a gas mixture of 30% ethylene, 62% water vapor and 8% oxygen is passed at 290° C. and with a contact time of 0.5 second; 6% of the ethylene is transformed into acetaldehyde, 6% to acetic acid and slightly over 1% to carbon oxides.

EXAMPLE 10

To a solution containing 1000 g. of $Na_2MoO_4 \cdot 2H_2O$ in 2 liters of water, 100 cc. of 85% $H_3PO_4$ and 1 liter of concentrated hydrochloric acid are added. An extraction is repeatedly carried out with ether, thus obtained pure phosphomolybdic acid ($H_3PMo_{12}O_{40} \cdot 29.5H_2O$) by evaporation. 500 g. of this acid dried at 110° C. is dissolved in 2.25 liters of water; to this solution 1600 g. of silica gel, previously dried at 500° C. for 12 hours and ground to a size between 7 and 10 mesh, is added. The resulting mass is vigorously stirred for 5 minutes and permitted to stand for 2 hours. The silica-supported catalyst is dried over a water bath, taking care to mix regularly, and next the product is heated in an oven at 110° C. and is activated for 10 hours at 300° C. with a vigorous air circulation to produce an effective catalyst.

When a gas mixture of 30% ethylene, 60% water vapor and 10% oxygen at 290° C. is passed over this catalyst with a contact time of 5 seconds, 23.4% of the original ethylene is converted to acetic acid, 3% to acetaldehyde and 3% to carbon oxides. The solution obtained has about 27% by weight of acetic acid.

EXAMPLE 11

Over the same catalyst as in the preceding example, a gas mixture of 7% ethylene, 42% air and 51% water vapor is passed at 325° C. for a contact time of 2 seconds. A total ethylene conversion of about 90% ensues, namely 75% to acetic acid and 14% to carbon oxides. If instead, the air is introduced in three portions, namely one portion at the inlet of the reactor and the other two at one-third and two-thirds of the length of the reactor, the total conversion percentage is reduced slightly (to 87%) but there is a better selectivity. There is in fact a conversion of 78% to acetic acid and 8% to carbon oxides with respect to the introduced ethylene.

The productivity or efficiency corresponds in this case to 120 g. of 100% acetic acid per liter of catalyst per hour.

EXAMPLE 12

400 g. of silica gel activated at 500° C. are impregnated with a solution containing 200 g. of phosphomolybdic acid prepared as in Example 10 and 45 g. of $Bi(NO_3)_3 \cdot 5H_2O$. The mass is allowed to stand for about 12 hours and then it is dried over a water bath. The remaining treatment proceeds as described in Example 10 taking care that activation is continued until all nitrous vapors have been eliminated.

Over 500 g. of this catalyst, a gas mixture of 28% ethylene, 16% oxygen and 56% water vapor (by volume) is passed at 330° C. with a contact time of 3 seconds; the oxygen is divided into three equal portions and introduced at three different points (in the direction of flow) into the reactor. A total conversion of 35.3% of ethylene to acetic acid and 6% to carbon oxides is obtained. The solution collected from the catalyst has a concentration by weight of over 35% of acetic acid.

EXAMPLE 13

The catalyst is prepared by reacting, while hot, a solution of 91.37 g. of phosphomolybdic acid (see Example 10) with an aqueous solution, which is added slowly containing 9.09 g. of $MnCO_3 \cdot nH_2O$ (about 42% by weight Mn).

300 g. of silica gel is vacuum impregnated with this solution and activated at 500° C. for 6 hours.

The catalyst is permitted to stand through the night, then dried over a water bath and finally dried at 200° C. for 12 hours.

Over this catalyst, a gas mixture of 26% ethylene, 69% water vapor, and 5% oxygen (by volume) is passed at 250° C. with a contact time of 1 second; 10% of the ethylene is transformed into acetaldehyde, 4.0% to acetic acid and 1% to carbon oxides.

EXAMPLE 14

The catalyst is prepared by reacting a solution of 91.37 g. of phosphomolybdic acid (see Example 10) dissolved in 450 cc. of $H_2O$ with 20.2 g. of $Co(NO_3)_2 \cdot 6H_2O$.

300 g. of silica gel is vacuum impregnated with this cold solution. The silica gel is left in contact with the impregnating solution for one night, dried over a water bath and then dried for 12 hours at 200° C. in an oven.

Over this catalyst a gaseous mixture of 37% ethylene, 56% water vapor and 7% oxygen is passed at 290° C. with a contact time of 3 seconds; 2% of the ethylene is transformed into acetaldehyde, 18% to acetic acid and 3% to carbon oxides.

EXAMPLE 15

300 g. of $TiO_2$ are mixed with a solution containing 53.6 g. of phosphomolybdic acid (see Example 10) and 98.27 g. of $H_3PO_4$ at 85%. The mass is then dried for 24 hours at 110° C.

Over this catalyst, a gas mixture of 31% ethylene, 64% water vapor and 5% oxygen (by volume) is passed at 290° C. with a contact time of 0.9 second; 1% of the ethylene is transformed into acetaldehyde, 8% to acetic acid and 1% to carbon oxides.

EXAMPLE 16

To an aqueous solution 10.78 g. of $Ce(NO_3)_3 \cdot 6H_2O$ at 98%, is added a solution containing 8.92 g. of $$Na_2MoO_4 \cdot 2H_2O$$

at 99%. The washed precipitate is dissolved in 84.2 g. of $H_3PO_4$ at 85% and thereafter a solution is added containing 47.54 g. in 200 cc. of water of phosphomolybdic acid (see Example 10).

With this solution 78.6 g. of macroporous silica gel dried for 3 hours at 300° C. is impregnated under vacuum. The catalyst is held under vacuum for some hours, dried over a water bath and then dried at 160° C. for 4 hours in an oven.

Over this catalyst, a gas mixture of 30% ethylene, 64% water vapor and 6% oxygen is passed at 250° C. with a contact time of 0.6 second; 12% of the ethylene is transformed into acetaldehyde, 1% to acetic acid and 1.2% to carbon oxides.

EXAMPLE 17

To an aqueous solution containing 5.147 g. of $$Ce(NO_3)_3 \cdot 6H_2O$$

at 98%, ammoniacal $H_2O_2$ is added at 70–80° C. After washing with hot $H_2O$, the precipitate formed is dissolved in a solution containing 31.09 g. of $H_3PO_4$ at 100% and 2–3 cc. of concentrated $HNO_3$.

The solution thus obtained is added to another containing 27.37 g. of phosphomolybdic acid (see Example 10) dissolved in $H_2O$.

The volume of the final solution must be equal to that of the support, represented by 36.3 g. of Aerosil with a surface area of 460 m.$^2$/g., dried at 300° C. for 3 hours. The Aerosil is impregnated with the solution mentioned above.

Over this catalyst, a gas mixture of 31% ethylene, 63% water vapor and 6% oxygen is passed at 250° C. with a contact time of 0.4 second; 8% of the ethylene is transformed into acetaldehyde, and 0.3% to carbon oxides.

EXAMPLE 18

3.1 g. of 85% phosphoric acid diluted in 10 cc. of water are reacted with 39.2 g. of molybdenum trioxide, while heating.

Evaporation is carried out until the mass is almost dry, 10 cc. of water is added and the sequence of operations was repeated until a fairly fluid and homogeneous paste is obtained. After cooling 80 cc. of water were added and the mass permitted to stand for 17 hours. 300 g. of titanium dioxide in gel or in powder form are then impregnated with this mixture. The resulting mass is first dried over a water bath and then in an oven at 160° C., for 4 hours.

This catalyst, acting on a gaseous mixture of 15% ethylene, 80% water vapor and 5% oxygen at 290° C. and with a contact time of 0.2 second, converted 16% of ethylene acetaldehyde, 11% to acetic acid and 3% to carbon oxides.

EXAMPLE 19

54.5 g. of freshly precipitated tungsten trixoide and 12.8 g. of molybdenum trioxide are treated with 75 g. of 85% phosphoric acid. The temperature of the mixture is gradually increased under continuous stirring until the water has been eliminated, fresh water is then admixed and the mass is re-heated; this operation is repeated three times. Finally the mass is permitted to cool, 100 cc. of water is added and the resulting mass left at rest for 20 hours. 240 cc. of silica are then introduced into the mixture and then the resulting mass is dried for 4 hours at 160° C.

This catalyst gives results which are in all respects similar to those given under Example 1.

EXAMPLE 20

A solution of 24.07 g. of phosphomolybdovanadic acid dissolved in 100 cc. of $H_2O$ is vacuum impregnated into 96.3 g. of silica gel activated at 300° C. for 4 hours. The catalyst sets for one night, is dried over a water bath, and then dried for 12 hours at 220° C., in an oven The catalyst contains 20% of phosphomolybdovanadic acid prepared in accordance with the method indicated by A. J. Kokorin (J. Gen. Chem. (USSR) 24, page 967). This method comprises reacting, while hot, stoichiometric quantities of phosphoric and molybdic acid with an excess of sodium vanadate in respect to the formula $$H_7[P(Mo_2O_7)_3V_2O_6]$$

For Example 75 g. of sodium vanadate, 12 cc. of $$H_3PO_4(d. 1.44)$$

185 g. of molybdic acid and 2000 cc. of $H_2O$ are refluxed. After cooling, the solution is treated, in a separatory funnel with 500 cc. of ethyl ether and thereafter 450 cc. of concentrated HCl is added gradually. A layer of heavy oil is formed and further concentrated HCl is added. The heavy layer is then transferred into another separatory funnel wherein further quantities of $H_2O$ and ether are introduced. The oily layer is placed in a crystallizer and the ether permitted to evaporate at room temperature.

Over this catalyst, a gas mixture of 23% ethylene, 67% water vapor and 10% of oxygen (by volume) is passed at 250° C. with a contact time of 0.5 second; 10% of the ethylene is transformed into acetic acid and 1.3% into carbon oxides.

EXAMPLE 21

21.1 g. of $NH_4VO_3$, 64.8 g. of $MoO_3$, 17.1 g. of $$Na_2SiO_3 9H_2O$$

300 cc. of $H_2O$ and 11 cc. of concentrated $NH_3$ are mixed while cold. The mixture is brought to its boiling point until the salts are completely dissolved. It is cooled to a room temperature and the residue is eliminated by filtering. To the solution, which is placed in a separatory funnel, we add 200 cc. of ethyl ether and a little $H_2SO_4$ (1:1) so that the solution is kept clear and the oily layer, constituted by the etherate of the heteropoly acid, is separated.

The etheric extract is recovered and diluted with a volume of water equal to half the starting volume. The ether is then eliminated by air evaporation.

The crystals are filtered from the mother liquor and dried at room temperature.

The heteropoly acid is dissolved in a volume of water equal to that of the silica gel required for obtaining a concentration in the active element of 14%.

Over this catalyst a gas mixture of 25% ethylene, 67% water and 8% oxygen (by volume) is passed at 250° C. with a contact time of 5 seconds; 2.5% of the ethylene is transformed into acetaldehyde, 18% to acetic acid and 3.1% to carbon oxides.

EXAMPLE 22

A solution of 17.37 g. of phosphomolybdotungstovanadic acid in 100 cc. of water is used to vacuum impregnate 69.5 g. of silica gel, which has been activated for 6 hours at 500° C. The mixture is permitted to stand under vacuum for one night, then dried over water bath and finally dried at 200° C. in an oven for 12 hours.

The catalyst contains 20% by weight $$H_7[P(Mo_2O_7)_4W_2O_7V_2O_6]$$

acid prepared according to the method indicated by A. J. Kokorin (J. Gen. Chem. USSR) 27, pages 615–621 (1957), operating for example, as follows:

92.0 g. of $Na_2WO_4·2H_2O$ in 500 cc. of $H_2O$ and 270 g. of $Na_2MoO_4·2H_2O$ in 850 g. of $H_2O$ are dissolved separately. To the two solutions, HCl is added and then the solutions are heated in order to transform the tungstate and the molybdate into the corresponding metacompounds; the two solutions are mixed while hot. Thereafter 50 g. of $Na_2HPO_4·12H_2O$ and 68 g. of $NaVO_3$ dissolved in 150 cc. of $H_2O$ are added. The solutions are mixed together, acidified by a small quantity of $H_2SO_4$ (1:1) until the solution turns yellow and then it is reflux boiled for 2 hours. After cooling additional $H_2SO_4$ (1:1) and ether are added drop by drop with stirring in order to form the corresponding etherate.

The formation of the etherate is exothermic so that the solution must be cooled during the addition of ether and sulphuric acid. The acid is added in small portions to the point when no more etherate is formed. One proceeds thereafter as described in Example 20 for the oily layer.

Over this catalyst a gas mixture of 26% ethylene, 63% water vapor and 11% oxygen is passed at 290° C. with a contact time of 0.6 second; 3.5% of the ethylene is transformed into acetaldehyde, 17% to acetic acid and 3% to carbon oxides.

EXAMPLE 23

85 g. of ammonium molybdate is dissolved in 500 cc. of water; the mass is brought to a boil and drop by drop a 0.1 molar solution of the double aluminum and ammonium sulphate is added under vigorous stirring until the beginning of the precipitation. On cooling, hydrate crystals are formed containing $Al_2O_3$, $MoO_3$ and $NH_4OH$. After re-crystallization, the ammonium ion is eliminated from the product in a 20% solution, by passing it over ion exchange resins. 118 g. of silica gel are impregnated with the solution.

Under the reaction conditions of Example 9, there was a conversion of the ethylene as follows: 8.5% to acetic acid and 1% to carbon oxides.

Catalysts may be prepared in a similar manner with the aluminum replaced by chromium iron. These catalysts are much more active than prepared by simply associating the two oxide components.

EXAMPLE 24

28 g. of $MoO_3$ are reacted with 100 cc. of $H_2O_2$ conc. (120 vol.).

The solution is dried over a water bath and then it is redissolved while hot with 100 cc. of $H_2O_2$ at 120 vol. 3.9 g. of $K_2TiF_6$ are added and permitted to stand until the solution becomes clear.

200 g. of silica gel is impregnated with the final solution.

Over this catalyst a gas mixture of 28% ethylene, 67% water vapor and 5% oxygen is passed at 290° C. with a contact time of 1.2 seconds; 10% of the ethylene is transformed into acetic acid, 1.2% into carbon oxides and, 3.4% into acetaldehyde.

EXAMPLE 25

329 g. of silica gel and 50 g. of $MoO_3$ gel (both weights refer to anhydrous components)—freshly precipitated, are mixed together, heated at 90° C. for 2 hours and the liquid is then separated from the unreacted mass. 100 cc. of silica are then impregnated with this solution. The resulting product is drained and completely dried.

This catalyst, when treated with a gas mixture consisting of 30% ethylene, 62% water vapor and 8% oxygen (by volume), gives at 230° C. and 2 seconds contact time, the following conversion of the ethylene: 2% to acetaldehyde, 16% to acetic acid and 1% to carbon oxides.

EXAMPLE 26

40 g. of molybdenum trioxide are treated with 150 cc. of 33% hydrogen peroxide, dried, and mixed with 120 cc. of hydrogen peroxide; 240 cc. of silica is impregnated with this solution. The mass is then dried at 110° C. and subsequently at 200° C.

Using the mixture of the previous example, there is a conversion of ethylene at 350° C. and 0.5 second contact time, as follows: 6% to acetaldehyde, 1% to acetic acid and 1% to carbon oxides.

EXAMPLE 27

10 g. of vanadium pentoxide are dissolved in a solution composed of 150 cc. of water and 28 g. of dissolved dehydrated oxalic acid. The solution is slightly heated to promote the formation of carbon dioxide, then very slowly 29 g. of stannic tetrachloride is added.

The resulting solution is cooled and used to impregnate 100 g. of silica. The mass is permitted to stand for one night; thereafter the water is drained and the mass is dried at 220° C. for 12 hours.

When passing over this catalyst the reacting mixture of Example 9 at 310° C. and 0.5 second contact time, a 12.2% conversion to acetic acid and a 1.5% conversion to carbon oxides are obtained.

EXAMPLE 28

66.5 g. of tungsten trioxide at 97% is dissolved in an aqueous solution containing in 296 cc., 29.6 g. of NaOH at 97%.

It is filtered and then to the hot solution is added slowly 3 N nitric acid in such an amount that the precipitate formed at the beginning is redissolved; some additional nitric acid is then supplied until a greyish-yellow color is obtained. The solution is heated under stirring until gel formation and thereafter is permitted to stand. After complete formation of gel it is filtered and washed.

To the gel is added 71 g. of phosphoric acid (85% titer); the mass is nearly dried and, after addition of 100 cc. of water, permitted to stand for 17 hours.

The compound thus prepared, is mixed with 240 cc. of silica gel and dried over a water bath.

The catalyst is further dried for 4 hours at 160° C.

Over this catalyst a gas mixture of 26% ethylene, 71% water vapor and 3% oxygen is passed at 250° C. with a contact time of 3 seconds; 2.4% of the ethylene is transformed into acetaldehyde, 2% to acetic acid and 0.4% to carbon oxides.

We claim:
1. A vapor-phase process for producing acetaldehyde from ethylene, comprising the step of passing a gaseous mixture of the ethylene, water vapor and oxygen into gas/solid contact with a solid catalyst composed of a heteropolyoxide or heteropolyacid consisting of two components in chemical combination, said catalyst being selected from the group consisting of:

the reaction products of the reaction of molybdenum trioxide with phosphoric acid; of chromium hydrate $MnCO_3$ hydrate or $Co(NO_3)_2$ hydrate with phosphomolybdic acid; or ferric hydrate, $Ce_2(MO_4)_3$, [$Co(NO_3)_2$ hydrate], titanium dioxide, or cerium nitrate hydrate with phosphomolybdic acid and $H_3PO_4$; of molybdenum trioxide and phosphoric acid with titanium or tungsten oxide; of tungsten oxide with phosphoric acid; of ammonium vanadate and molybdenum trioxide with sodium silicate; of aluminum, chromium or iron ammonium sulphate with ammonium molybdate; of molybdenum trioxide with $K_2TiF_6$; of molybdenum trioxide gel with silica gel; and of stannic tetrachloride with the reaction product of the reaction of vanadium pentoxide with oxalic acid;

phosphomolybdic acid;
phosphomolybdicvanadic acid; and
phosphomolybdictungstovanadic acid, in a self-supporting state or on a silica-containing catalyst support, said ethylene in said gaseous mixture constituting between substantially 5 and 70% thereof, said gaseous mixture being maintained in contact with said catalyst for a period of about 0.05 to 10 seconds at a temperature between about 180° and 400° C. and at a pressure no greater than substantially 10 atmospheres, the molar ratio of said water vapor to said ethylene being substantially 1 to 10 and the molar ratio of said oxygen to said ethylene being substantially 1 to 10 and the molar ratio of said oxygen to said ethylene being substantially 0.1 to 5 in said gaseous mixture.

2. The process defined in claim 1 wherein said gaseous mixture is contacted with said solid catalyst continuously, further comprising the step of introducing the oxygen component of said gaseous mixture into contact with said solid catalyst at a plurality of locations spaced therealong in the direction of flow of the mixture over the catalyst.

3. The process defined in claim 1 wherein said solid catalyst is prepared by the steps of: forming at least one of the reactants in a liquid vehicle and admixing another of the reactants with said liquid vehicle, thereafter mixing the vehicle containing said reactants with a silica support in a comminuted state thereof, and evaporating said liquid vehicle from the resulting mixture to dry said catalyst, said gaseous mixture being contacted with said catalyst in a dry state of the latter.

4. A vapor-phase process for producing acetaldehyde from ethylene in a gaseous state, comprising the steps of passing a gaseous mixture of the ethylene, water vapor and oxygen into gas/solid contact with a solid catalyst composed of a heteropolyoxide or heteropolyacid selected from the group which consists of:

the reaction product of the reaction of molybdenum trioxide with phosphoric acid; of chromium hydrate, $MnCO_3$ hydrate or $Co(NO_3)_2$ hydrate with phosphomolybdic acid, of ferric hydrate, $Ce_2(MoO_4)_3$, titanium dioxide, or cerium nitrate with phosphomolybdic acid and $H_3PO_4$; of molybdenum trioxide and phosphoric acid with titanium or tungsten oxide; of tungsten oxide with phosphoric acid; of ammonium vanadate and molybdenum trioxide with sodium silicate; of aluminum, chromium or iron ammonium sulphate with ammonium molybdate; of molybdenum trioxide gel with silica gel; and of stannic tetrachloride with the reaction product of the reaction of vanadium pentoxide with oxalic acid;
phosphomolybdic acid;
phosphomolybdicvanadic acid; and
phosphomolybdictungstovanadic acid, in a self-supporting state or on a silica-containing catalyst support, said ethylene in said gaseous mixture being maintained in contact with said catalyst for a period of about 0.05 to 10 seconds at a temperature between about 200° and 250° C. and at a pressure between 1 and 5 atmospheres, the molar ratio of said water vapor to said ethylene being substantially 1 to 10 and the molar ratio of said oxygen to said ethylene being substantially 0.1 to 5 in said gaseous mixture.

5. The process defined in claim 4 wherein said solid catalyst is prepared by the steps of: forming at least one of the reactants in a liquid vehicle and admixing the other of the reactants with said liquid vehicle, thereafter mixing the vehicle containing said reactants with a silicon support in a comminuted state thereof, and evaporating said liquid vehicle from the resulting mixture to dry said catalyst, said gaseous mixture being contacted with said catalyst in a dry state of the latter.

References Cited
UNITED STATES PATENTS

| | | | |
|---|---|---|---|
| 2,941,007 | 6/1960 | Callahan et al. | 260—604 |
| 3,065,264 | 11/1962 | Koch et al. | 260—533 |
| 3,118,927 | 1/1964 | Foster | 260—533 |
| 3,098,102 | 7/1963 | Bethell et al. | 260—533X |
| 3,190,913 | 6/1965 | Fetterly et al. | 260—533 |
| 3,192,259 | 6/1965 | Fetterly et al. | 260—533 |
| 3,104,263 | 9/1963 | Reimenschneider | 260—533X |

LEWIS GOTTS, Primary Examiner

R. S. WEISSBERG, Assistant Examiner

U.S. Cl. X.R.
260—533R, 597R